US008837255B2

(12) United States Patent
Ross et al.

(10) Patent No.: US 8,837,255 B2
(45) Date of Patent: Sep. 16, 2014

(54) SEISMIC ACQUISITION METHOD AND SYSTEM

(75) Inventors: Allan Ross, Houston, TX (US); Raymond Lee Abma, Houston, TX (US)

(73) Assignee: BP Corporation North America Inc., Houston, TX (US)

(*) Notice: Subject to any disclaimer, the term of this patent is extended or adjusted under 35 U.S.C. 154(b) by 114 days.

(21) Appl. No.: 13/315,947

(22) Filed: Dec. 9, 2011

(65) Prior Publication Data

US 2012/0147701 A1 Jun. 14, 2012

Related U.S. Application Data

(60) Provisional application No. 61/421,274, filed on Dec. 9, 2010, provisional application No. 61/503,407, filed on Jun. 30, 2011.

(51) Int. Cl.
*G01V 1/38* (2006.01)
*G01V 1/08* (2006.01)
*G01V 1/00* (2006.01)

(52) U.S. Cl.
CPC .............. *G01V 1/006* (2013.01); *G01V 1/005* (2013.01)
USPC ............. 367/24; 367/15; 367/23; 181/111; 181/115

(58) Field of Classification Search
CPC ............................. G01V 1/005; G01V 1/006
USPC .......................................... 367/56, 58, 59, 47
See application file for complete search history.

(56) References Cited

U.S. PATENT DOCUMENTS 3,638,752 A * 2/1972 Wakefield .................... 181/120
4,458,339 A * 7/1984 Wason ........................... 367/14
4,693,336 A * 9/1987 Newman ..................... 181/111

(Continued)

FOREIGN PATENT DOCUMENTS

WO 2009/1131619 A2 10/2009

OTHER PUBLICATIONS

PCT International Search Report and Written Opinion of the International Searching Authority, mailed on Mar. 6, 2012, in related International application No. PCT/US2011/064144, 13 pages.

(Continued)

*Primary Examiner* — Luke Ratcliffe
*Assistant Examiner* — Hovhannes Baghdasaryan
(74) *Attorney, Agent, or Firm* — Gunnar Heinisch

(57) ABSTRACT

The maximum output of a seismic source array may be reduced by activating the individual seismic sources within these seismic source array in a pattern that is extended in time rather than by the presently employed conventional simultaneous activation of a large number of individual seismic sources. Methods are disclosed which take data shot with patterned sources and may use a sparse inversion method to create data with the about same image quality as that of conventional sources. In this manner the output of the maximum impulse of a seismic source array may be reduced by an amplitude factor of about 10 in the examples shown here, corresponding to a reduction of about 20 dB while maintaining virtually the same seismic image quality. The disclosed methods may be used in combination with any simultaneous sourcing technique. In addition, the disclosed methods may be used with a plurality of source arrays.

11 Claims, 15 Drawing Sheets

(56) References Cited

U.S. PATENT DOCUMENTS

| | | | |
|---|---|---|---|
| 4,739,858 A | | 4/1988 | Dragoset, Jr. |
| 5,995,452 A | * | 11/1999 | Bouyoucus .................. 367/153 |
| 6,906,981 B2 | | 6/2005 | Vaage |
| 7,257,049 B1 | | 8/2007 | Laws et al. |
| 8,014,228 B2 | * | 9/2011 | Schreurs et al. ................ 367/16 |
| 2002/0181328 A1 | | 12/2002 | de Kok |
| 2004/0013037 A1 | | 1/2004 | Vaage |
| 2005/0034917 A1 | | 2/2005 | Mathiszik et al. |
| 2008/0205191 A1 | * | 8/2008 | Coste et al. ..................... 367/15 |
| 2009/0168600 A1 | | 7/2009 | Moore et al. |
| 2010/0039894 A1 | | 2/2010 | Abma |
| 2010/0208554 A1 | * | 8/2010 | Chiu et al. ................... 367/153 |
| 2012/0014212 A1 | | 1/2012 | Eick et al. |

OTHER PUBLICATIONS

Peeter Akerberg et al., "Simultaneous Source Separation by Sparse Radon Transform", SEG Las Vegas Annual Meeting, 2008, XP007908688, Chevron, San Ramon, California, pp. 2801-2805.

Abma et al., "Seperating Simultaneous Sources By Inversion", 71st EAGE Conference & Exhibition, Amsterdam, The Netherlands, Jun. 8-11, 2009, 6 pages.

Abma et al., "3D Interpolation of Irregular Data With a POCS Algorithm", Annual Meeting Selections, Geophysics, vol. 71, No. 6, Nov.-Dec. 2006, p. E91-E97.

Beasley, "Simultaneous Sources: A Technology whose Time has Come", 2008, pp. 2796-2800, Publisher: Society of Exploration Geophysicists, Published in: US.

Berkhout, et al., "From Simultaneous Shooting to Blended Acquisition", 2008, pp. 2831-2838, Publisher: Society of Exploration Geophysicists, Published in: US.

"Hampson, et al.", "Acquisition Using Simultaneous Sources", 2008, pp. 2816-2820, Publisher: Society of Exploration Geophysicists, Published in: US.

Howe, et al., "Independent Simultaneous Sweeping—A Method to Increase the Productivity of Land Seismic Crews", 2008, pp. 2816-2830, Publisher: Society of Exploration Geophysicists, Published in: US.

Moore, et al., "Simultaneous Source Separation Using Dithered Sources", 2008, pp. 2806-2810, Publisher: Society of Exploration Geophysicists, Published in: US.

Anton Ziolkowski, "The Delft Airgun Experiment", Jun. 1984, pp. 9-18, Publisher: First Break, Published in: US.

* cited by examiner

SEISMIC ACQUISITION METHOD AND SYSTEM

CROSS-REFERENCE TO RELATED APPLICATIONS

This application claims the benefit of U.S. Provisional Application Ser. No. 61/421,274, filed Dec. 9, 2010, and U.S. Provisional Application Ser. No. 61/503,407, filed Jun. 30, 2011, and are incorporated herein by reference in their entireties for all purposes.

STATEMENT REGARDING FEDERALLY SPONSORED RESEARCH OR DEVELOPMENT

Not applicable.

BACKGROUND

1. Field of the Invention

This invention relates generally to the field of geophysical exploration. More specifically, the invention relates to a method of patterned seismic shots for marine applications.

2. Background of the Invention

In marine seismic surveys, a seismic energy source is used to generate seismic energy in the form of acoustic pulses or waves in a body of water such a lake or the ocean. The seismic energy travels downward in the water, through the water bottom, and through the subterranean formations underlying the water bottom. Part of the energy passing through the subterranean formations underlying the water bottom is reflected upward therefrom at acoustic impedance boundaries in the Earth formations. The upward traveling energy is detected by sensors such as hydrophones towed in one or more streamer cables disposed near the water surface, or by sensors disposed in cables along the water bottom. The sensors convert the detected energy to electrical or optical signals. The electrical or optical signals are then conditioned and interpreted to provide information both as to the composition and the structure of the various subsurface Earth formations. Such information is used particularly to determine the possibility that such Earth formations may contain mineral deposits such as hydrocarbons.

Several different types of seismic energy sources have been used in the past to produce seismic energy in a form required in marine seismic surveys. For example, explosives have been used as a marine seismic energy source. Another type of marine seismic energy source, called a gas gun, includes detonating combustible gases in a chamber and then expelling the resultant gas charge into the water to produce the seismic energy. In marine seismic data acquisition, an air gun is the most employed acoustic or seismic source. In such air guns the sound is generated by letting high pressure air (100-200 atmospheres) escape through port openings in the air gun.

A single air gun produces a seismic pulse having acoustic energy related to a complex pressure interaction between the air bubble and the water that causes the bubbles to oscillate as they rise toward the water surface. Such interaction can produce extraneous bursts of seismic energy following the initial energy burst. The amplitude and periodicity of these bubble-generated extraneous bursts depend on, among other factors, the depth of the gun in the water and the size of the pressurized air chamber in the gun. As such, it is common to use an array of air guns having various different chamber sizes, and firing such guns simultaneously. Such firing of an array of air guns provides several advantages over firing a single air gun. First, the total amount of energy being imparted into the Earth's subsurface for each seismic "shot" is increased. In addition, the different chamber sizes for the various guns will produce different bubble responses, causing the bubble responses to tend to cancel each other. The directivity of the energy source toward the water bottom can be improved, because other than directly below the source array, some frequencies in the seismic energy will be attenuated by the spatial distribution of the guns in the array. Thus, conventional air gun arrays simultaneously discharges all the air guns in the array. This generates a strong signal with a more impulsive signal than any single air gun.

The design of conventional marine air gun arrays is usually fixed for the duration of a seismic survey. While some air gun array attributes can be altered in processing, more processing flexibility in shaping the source signal is desirable. Conventional air gun arrays generate a strong impulsive signal (see FIG. 5). In addition to generating a seismic signal into the subsurface the impulse may create interfering noise with other seismic surveys, mechanical vibration on the hull of the towing vessel and fatigue for the crew.

Consequently, there is a need for a method and system for seismic acquisition that will allow the reconstruction of a seismic source array in processing enabling more flexibility than a conventional fixed air gun array, while maintaining signal strength.

BRIEF SUMMARY

These and other needs in the art are addressed in one embodiment by a method of seismic acquisition comprising individually firing the seismic sources within a seismic source array over time. The motivation behind the disclosed methods is to reduce the impact to marine mammals by reducing the acoustic output of seismic source arrays. The maximum output of an array may be reduced by shooting the individual seismic sources (e.g., air guns) in a pattern that is extended in time rather than by the presently employed conventional simultaneous firing of a large number of individual seismic sources. By individually firing the seismic sources within the array over time, the amplitude of the array may be reduced. Methods are disclosed which take seismic data acquired from the random firing patterns and use a sparse inversion method to create data with the about same image quality as that of conventional sources. In this manner the output of a seismic source array may be reduced by an amplitude factor of about 10 in the examples shown here, corresponding to a reduction of about 20 dB while maintaining virtually the same seismic image quality. The methods disclosed herein are contrary to conventional techniques because typically other seismic methods seek to maximize amplitude in order to increase seismic image quality. In contrast, the methods seek to minimize amplitude, yet retain seismic image quality through innovative processing techniques. Patterned seismic shots may result in lower peak sound pressure levels than conventional marine air gun arrays while maintaining approximately the same energy.

In an embodiment, a method of seismic acquisition comprises positioning a first seismic source array comprising a plurality of seismic sources over a seismic survey region, the seismic source array generating an output amplitude. The method further comprises activating the first seismic source array according to one of a plurality of different firing patterns, the firing patterns comprising a plurality of different time intervals between the activation of each seismic source within the first seismic source array. Each firing pattern is optimized so as to minimize the output amplitude. The method also comprises recording a plurality of seismic signals reflected from one or more subterranean formations.

In another embodiment, a method of minimizing output amplitude during seismic acquisition comprises positioning a seismic source array comprising a plurality of seismic sources over a seismic survey region, the seismic source array generating an output amplitude. In addition, the method comprises generating one or more firing patterns. Each firing patterns comprises a plurality of time intervals between the firing of each seismic source within the seismic source array. The time intervals are calculated according to an algorithm to minimize the output amplitude. The method further comprises activating the seismic sources within the seismic source array according to the one or more firing patterns so as to minimize the output amplitude of the seismic source array.

In yet another embodiment, a seismic system comprises a first seismic source array comprising a plurality of impulsive seismic sources. The seismic source array generates an output comprising an amplitude. The system also comprises a controller operatively coupled to the seismic source array. The controller is programmed to activate the seismic sources according to one of a plurality of firing patterns. Each firing pattern is optimized to reduce the output amplitude The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings.

NOTATION AND NOMENCLATURE

Figure 1:
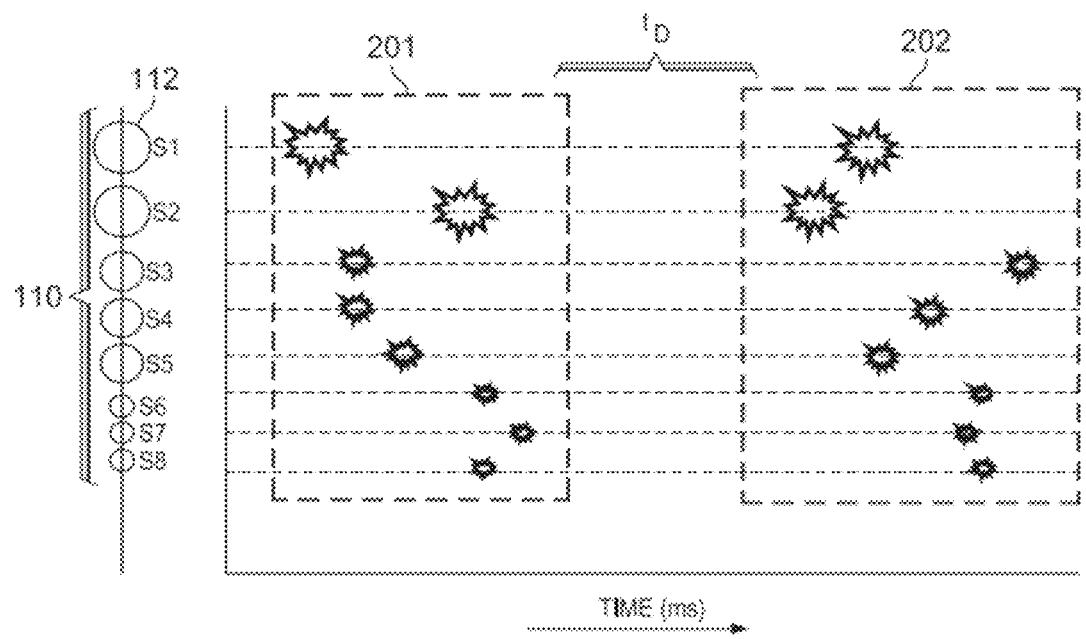
FIG. 1 illustrates an embodiment of the method of seismic acquisition.

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

As used herein, "continuous recording" may refer to the recording of seismic data across the time gaps that occur between conventional seismic records. A single, continuous record is as long as many conventional seismic records and thus contains the seismic arrivals generated by the initiation of many seismic sources. A continuous record can be up to many hours in length (even in a geologic environment in which seismic records need only be a few seconds) and may, but need not, be carved into numerous shorter records, either contiguous with one another, or overlapping, or even discarding certain time windows from the continuous record.

As under herein, an "array" or "seismic source array" may refer to multiple or a plurality of individual seismic sources closely spaced or grouped together to, in effect, act as a single seismic source.

As used herein, "independent simultaneous sourcing" may refer to multiple or a plurality of seismic sources or source arrays activated independently with no or very little coordination amongst them.

As used herein, "firing pattern" or "patterned source" may synonymously refer to a method of seismic acquisition, where instead of discharging all sources in a seismic source array substantially simultaneously, the seismic sources are discharged in a scheduled, random or pseudo-random pattern with delays or intervals between each source activation. Some sources may fire simultaneously, such as "source clusters" (e.g. 2, 3, or 4 sources of identical volume closely grouped), or in cases in which a specific objective was sought by simultaneously shooting a few of the several sources in the array.

As used herein, "non-continuous recording" may refer to the practice in seismic exploration of specifying the duration of a seismic record to the time window necessary to record all seismic waves of interest from the initiation of a seismic source. Typically, the beginning of recording is synchronized to the initiation of the seismic source and ends with the arrival at the seismic sensors of the last seismic arrivals that are of interest (usually deepest and most distant) in the seismic exploration of the particular geologic environment (plus a surplus to allow for mis-calculation, data processing, etc). The repetition interval of the sources is generally greater than the record length and the gaps between recordings represent wall-clock time that is not recorded; the gap in time also allows for the residual energy from the previous shot to be attenuated.

As used herein, "self simultaneous sourcing" may refer to repeatedly activating or initiating a single seismic source or source array is so that the shot records obtained will overlap in time with either the previous shot record or the following shot record, or both. This is the method of shooting a number of shots from a single gun or array of guns where the expected trace length is greater than the time between shots. For example, if 10 second records are desired, shots may be obtained every 5 seconds, and the overlapping shots are separated in processing.

As used herein, "simultaneous sourcing technique" may refer to any seismic acquisition or sourcing method where more than one seismic source or source arrays are fired or activated in parallel.

DETAILED DESCRIPTION OF THE PREFERRED EMBODIMENTS

FIG. 1 illustrates schematically an embodiment of a method of seismic acquisition. In general, the method entails firing individual seismic sources 112 within an array 110 of such sources according to one of a plurality of different firing patterns 201, 202. The firing patterns 201, 202 shown in FIG. 1 are for illustrative purposes only and should not be construed as limiting in any way. As shown in FIG. 1, seismic source array 110 includes a plurality of individual seismic sources, where S1 through S8 represent each seismic source 112 within the array 110. Although seismic sources S1 through S8 are shown as air guns, as will be described in more detail below, any number, volume and type of seismic sources 112 may be included in an array 110. As an example, FIG. 1 shows an array 110 where S1 and S2 represent the same large volume air gun, S3 through S5 are the same medium volume air gun, and S6 through S8 are the same small volume airgun.

The firing patterns 201, 202 may be generated beforehand and loaded on to a controller, which controls the firing of the seismic sources or may be generated real time by the controller itself The firing patterns generally comprise a set of random time intervals or delays between the firing or activation of each seismic source 112. Moreover, each firing pattern is optimized so as to minimize the output amplitude. In each firing pattern, each seismic source 112 may fire at different times or alternatively, some seismic sources 112 in the array 110 may fire at the same time. An algorithm or program may be used to generate the optimized random firing patterns within certain constraints, which are described in more detail below. The seismic signals acquired from these firing patterns or patterned shots may be processed by any methods known to those of skill in the art. In an embodiment, as shown in FIG. 1, there may be a time delay, $t_D$, between firing patterns, 201, 202. The time delay, $t_D$, may be any suitable non-zero time period. In an embodiment, the time delay, $t_D$, may be varied or may remain consistent. The time delay may be varied randomly, pseudo-randomly, or according to a pattern. Furthermore, although FIG. 1 only shows a first firing pattern 201 followed by a second firing pattern 202, in practice, the subsequent different firing patterns are successively initiated or activated many times during an entire seismic acquisition program. However, it some embodiments, it is envisioned that the same firing pattern may be used with varying time delays in between the same firing pattern.

Figure 2:
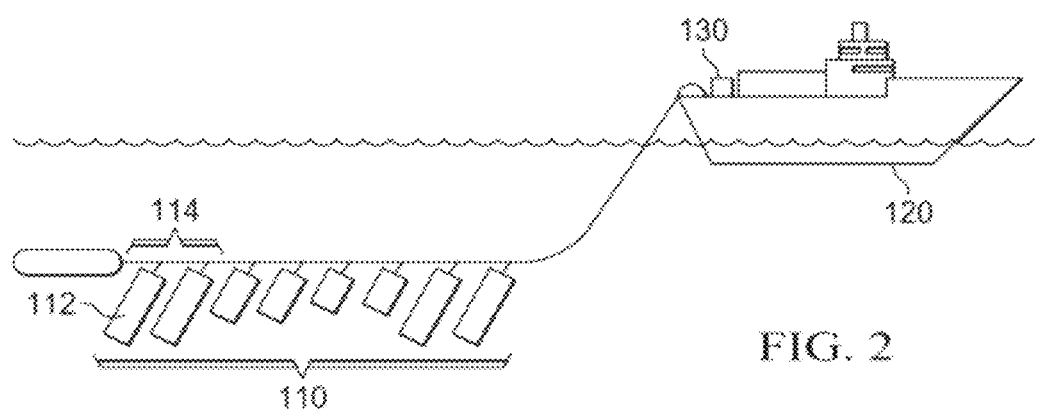
FIG. 2 illustrates an embodiment of a seismic system for implementing the disclosed method.

FIG. 2 illustrates an embodiment of a seismic system 100 which may be used to implement the methods disclosed herein. The seismic system may include the seismic array 110, the seismic sources 112, a seismic vessel 120 towing the array 110, and a controller 130 for controlling the timing of the seismic sources. Seismic vessel 120 may position seismic array 110 over a desired seismic survey region of the earth. Seismic sources 112 may be any seismic source known to those of skill in the art. Controller 130 may be pre-loaded with the firing patterns or routines for array 110. Alternatively, controller 130 may have a processor which determines in real time the firing patterns. Controller 130 communicates with and controls the firing of the seismic sources 112. Controller 130 may be located on the vessel 120 or located on the array 110 underwater. Although FIG. 2 depicts a marine seismic system 100, it is envisioned that the disclosed As already mentioned, the seismic sources may be any seismic source known to those of skill in the art. In an embodiment, the seismic source may be a source which repeatedly emits a single pulse of energy as opposed to a continuous sweep of energy. As used herein, such seismic sources are referred to as impulsive seismic sources. More particularly, examples of suitable impulsive seismic sources may include without limitation, air guns, gas guns, water guns, charges, explosives, combinations thereof, and the like. While embodiments of the method are primarily directed to impulsive sources, other more continuous or non-impulsive sources might also be employed, such as without limitation, vibrators, resonators, sirens, and combinations thereof.

Figure 3:
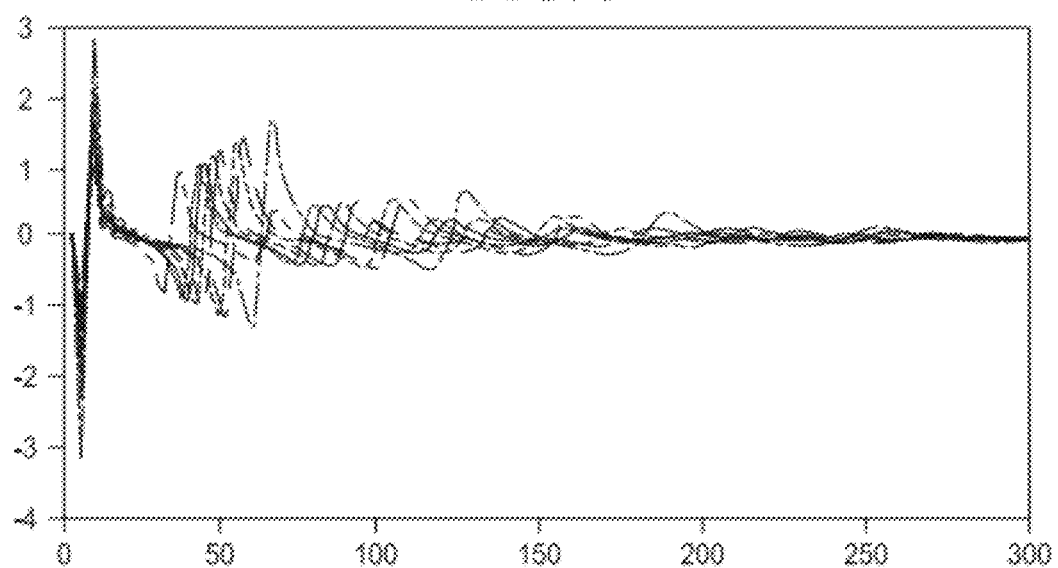
FIG. 3 illustrates the signatures of the 10 air guns used to build the 33-gun array. Volumes are 40, 70, 80, 100, 120, 140, 175, 200, 250, and 350 cubic inches, which may be used with embodiments of the method. (Time scale is in number of 2 msec samples.)
Figure 5:
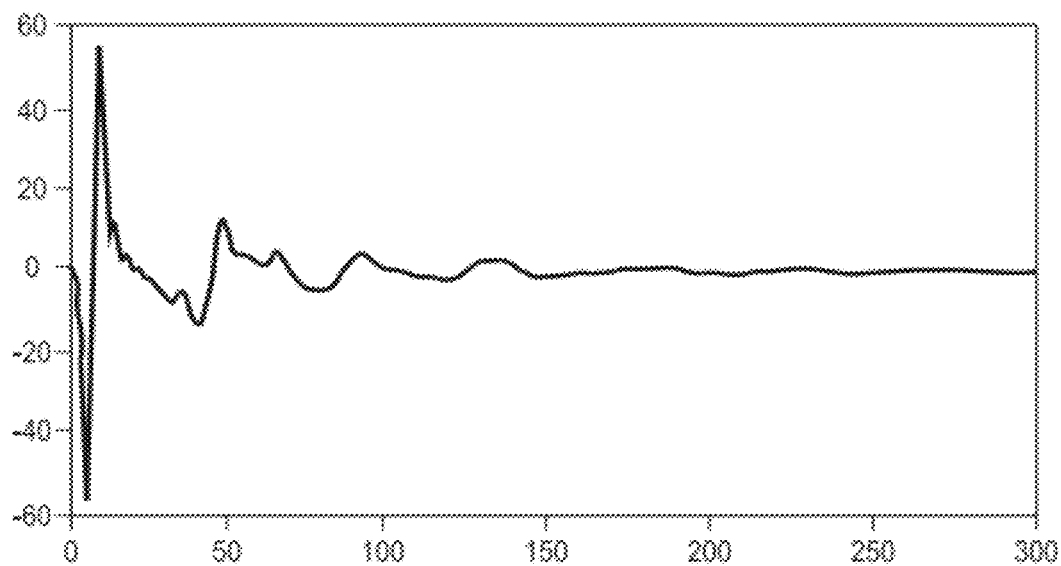
FIG. 5 illustrates the signature of a conventional air gun shot using the 33 gun array. (The time scale is number of 2 ms sample intervals.)

FIG. 3 shows the individual signatures of a typical array of impulsive seismic sources (e.g. air guns), which may be used in conjunction with the disclosed methods. Additionally, although the methods described herein are primarily directed to marine applications, they also may be applicable in land seismic operations. FIG. 5 depicts an example of signature of an impulsive seismic source array comprising air guns. In particular, FIG. 3 shows an exemplary embodiment of an air gun array with 10 different volumes of air guns. In this embodiment, a 33 gun array may include 4 guns of 40 cubic inches each, 2 guns of 70 cubic inches each, 3 guns of 80 cubic inches each, 8 guns of 100 cubic inches each, 4 guns of 120 cubic inches each, 4 guns of 140 cubic inches each, 2 guns of 175 cubic inches each, 2 guns of 200 cubic inches each, 2 guns of 250 cubic inches each, and 2 guns of 350 cubic inches each. However, any suitable array of marine seismic sources may be used in conjunction with embodiments of the disclosed methods. In addition, in embodiments using air guns, the air guns may be of any suitable volume. In particular, the air guns may have volumes ranging from about 1 cubic inch to about 1,000 cubic inches, alternatively from about 40 cubic inches to about 350 cubic inches, alternatively from about 80 cubic inches to about 500 cubic inches. In an embodiment, at least two of the seismic sources generate energy in different frequency ranges or generate different output amplitudes. In embodiments with air gun arrays, this means at least two of the air guns have different volumes from one another. However, embodiments of the method may also be used with arrays with airguns all having the same volume. Furthermore, any number of seismic sources may be used in the array.

The maximum amplitude of the seismic source array may be reduced generally by about one-tenth that of the conventional signature (i.e. simultaneous shots), or about a 20 dB reduction in the examples shown here. However, the maximum amplitude may be reduced by any amount desired. The maximum amplitude of the patterned seismic source signature is approximately that of the largest source in the array.

There are several parameters in generating a firing pattern. In particular, they are, without limitation, the firing pattern length which is the length of time from the firing of the first seismic source to the firing of the last seismic source, the order in which the sources fire, and the time intervals between the firings, and, the amplitude desired of any of the individual patterned arrays. It is contemplated that any suitable values may be used for these parameters. In embodiments, the firing pattern length may range from about 1 second to about 4 seconds, alternatively from about ½ second to about 2 seconds, alternatively from about 3 seconds to about 10 seconds. The time interval between firings may range from about 50 milliseconds to about 500 milliseconds, alternatively from about 150 milliseconds to about 250 milliseconds, alternatively from about 250 milliseconds to about 1 second.

Preferably, the patterns are different with respect to each other so that the notches in the spectra of adjacent patterned shots do not overlap significantly. Enough patterns should be created so as to allow significant randomness in adjacent patterns. That is, sequential firing patterns may all be different from one another. However, in some embodiments, some or all of the patterns may be the same. Any number of firing patterns may be generated and used with the disclosed methods. This number may be limited by the number of sources in the array and also the constraints and parameters chosen for the firing patterns.

The length of time over which the shots are fired is controlled by the limits on the maximum amplitude desired on each shot pattern signature and the shot resolution needed. If a firing time length is very short, the peak amplitude of the single gun shots tend to stack constructively, and the maximum amplitude of that pattern may not be reduced much lower than the conventional air gun array. If the firing time pattern length is too long, the reconstructed shot is smeared in space due to vessel travel. The order of the guns firing and the timing between them may be used to isolate the largest guns in the pattern sequence to minimize the stacking of single gun outputs and preventing the amplitude of the pattern shot from being minimized The sequencing of the guns in any individual source pattern is related to the notches in the spectra of the individual patterns. The notches in the spectra should cover as many different frequency ranges as possible. Since the sequencing of the individual sources in any given pattern also controls the maximum amplitude of any individual pattern, the fire time of each source must be carefully calculated and controlled.

Figure 6:
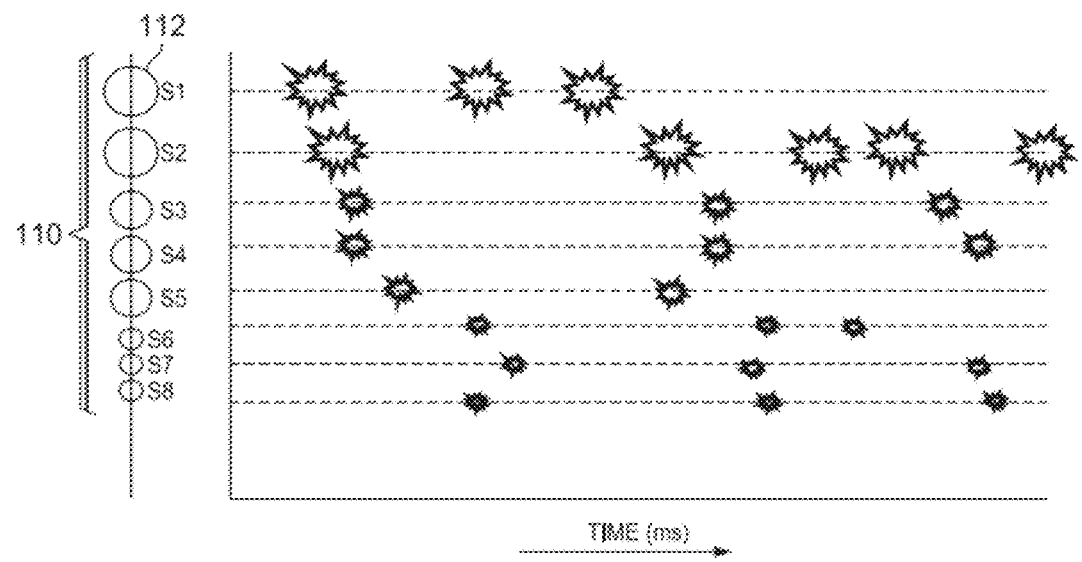
FIG. 6 illustrates an embodiment of the method of seismic acquisition with continuous firing patterns.

The combination of inversion for patterned shots and inversion for simultaneous shot separation opens the possibility of alternative acquisition source methods. For example, in one embodiment, as shown in FIG. 6, the method may include continuous shooting, which may also be referred to as "continuous patterned shooting" or "continuous firing patterns." In contrast, embodiments involving a time interval between firing patterns may be referred to as discrete patterned shooting or discrete firing patterns as shown in FIG. 1. Specifically, instead of shooting one firing pattern, having a delay, $t_D$, and then shooting a different firing pattern, the delay is removed and one firing pattern is immediately followed by another firing pattern. That is, $t_D$ will essentially be zero for continuous patterned shooting. As such, in some embodiments, there may be gaps of a few to several seconds between two firing patterns, but there need not be. When patterned or sequenced shots are used with a continuously varying source pattern while moving along a shot line, the shots may be partitioned into reconstructed shots with either large or small spatial extent. The reconstructed shot spacing may now become a processing parameter. For shallow high-resolution images, the reconstructed shot spacing may be set as small as possible. For imaging deep targets or in noisy areas, larger reconstructed shot spacings may be used to produce better signal. For air guns or impulsive sources, the minimum source spacing would be the actual interval between the individual firings or shots, although if this interval is irregular, interpolation may be used to reduce the shot spacing further. Without being limited by theory, the maximum derived reconstructed shot interval may depend on the spatial resolution required for imaging the desired targets.

The patterned source or firing pattern method may also be used to collapse a standard impulsive seismic sources array into an array much shorter by firing the impulsive seismic sources at the front of the array, followed by the impulsive seismic sources just aft as they occupy the same location as the front impulsive seismic sources when they fired. However, the seismic source array may be of any length. In embodiments, the seismic source array may range from about 1 meter to about 100 meters in length, alternatively 5 meters to about 50 meters, alternatively from about 5 meters to about 20 meters. The pattern would continue as the aft impulsive seismic sources occupied the same location as the front impulsive seismic sources when they fired.

In further embodiments, firing patterns may be combined with any suitable simultaneous seismic sourcing or acquisition techniques known to those of skill in the art. Examples of simultaneous seismic shooting techniques include without limitation, independent simultaneous sourcing, self simultaneous sourcing with one or more sources/arrays, or combinations thereof More detailed descriptions of such techniques are described in U.S. patent application Ser. Nos. 12/542,433, entitled "Method for Separating Independent Simultaneous Sources," and 12/851,590, entitled "Method for Separating Independent Simultaneous Sources," incorporated herein by reference in their entireties for all purposes. In an embodiment, a single source array may be used with discrete firing patterns in conjunction with self simultaneous sourcing. That is, the array may activate discrete firing patterns with a time interval between each firing pattern. However, the time interval or delay, $t_D$, between firing patterns may be such that the shot records obtained will overlap.

In another embodiment, a plurality of arrays may be employed where a first source array is shooting with firing patterns and at least a second array is shooting with either a self simultaneous sourcing method or with a conventional shooting technique (i.e. same or consistent time delays or period between firing patterns). The first and second array may be synchronized or unsynchronized with one another.

In other embodiments, firing patterns are not used. Instead, two or more seismic sources or source arrays may be employed where each seismic source or source array may each be firing with alternative simultaneous seismic shooting techniques including without limitation, independent simultaneous sourcing, self simultaneous sourcing with one or more sources/arrays, or combinations thereof.

In another exemplary embodiment, a first array may be shooting with firing patterns, and at least a second and third array may be shooting using an independent simultaneous sourcing technique, where all of the arrays may be synchronized, unsynchronized, random or pseudo-random with respect to one another. It is contemplated that any number of sources or source arrays may be used where each source or source array may be shooting with any combination of simultaneous sourcing or acquisition techniques such as without limitation, discrete firing patterns, continuous firing patterns, independent simultaneous sourcing, self simultaneous sourcing, or combinations thereof When a plurality of sources or source arrays are used, each source or source array may also combine different simultaneous shooting techniques, if possible, such as firing patterns in conjunction with self simultaneous sourcing.

In an exemplary embodiment, a plurality of arrays may be used where each of the arrays may be fired or activated independently of on another. Furthermore, each activation of an array may use a different firing pattern than the other array. The arrays may be coordinated/synchronized with another or unsynchronized. This is a variation of independent simultaneous sourcing, as defined previously. In an embodiment, the plurality of arrays may also each be shooting continuous firing patterns, where there are not any delays or intervals between firing patterns. In yet another embodiment, a first array may shoot with discrete firing patterns and a second array may shoot with continuous firing patterns.

This flexibility in the timing or shot interval may not be confined to the inline direction. If the source array has a crossline extent, firing the sources in a patterned manner in the crossline direction will allow the same freedom in choosing the crossline trace spacing.

Other applications of patterned shooting include, but are not limited to, noise mitigation, beam steer, low frequency generation, coded pulse sequences (such as mini-Sosie), fine spatial resolution, amplitude modulation, time-domain source arrays, with both pseudo-random and patterned fire sequences. Attenuation of the surface ghost reflection can be achieved by firing a single gun or a multiplicity of guns, followed by the firing of a second gun or second multiplicity of guns under the rising bubble or bubbles from the first gun or first multiplicity of guns.

If the sources can be prepared for rapid re-firing or re-shooting, the physical dimensions of the array might be reduced. In another embodiment, a single seismic impulsive source within the array may fire multiple times within a firing pattern.

In yet another embodiment, referring back to FIG. 2, seismic source clusters 114 may be used. That is, two or more seismic sources of the same volume may be controlled as a "cluster" and easily adapted so that each cluster is fired as a single gun in the firing pattern. More particularly, using the exemplary array in FIG. 1 as an example, sources S1 and S2 could be activated simultaneously and sources S3 through S5 could be activated simultaneously. Similarly, any number of guns, such as a subarray, could be elements of the pattern and fired simultaneously. Again using the array in FIG. 1 as an example to illustrate the principle and without being limiting, sources S1 and S8 may be activated simultaneously and sources S3 and S7 may be activated simultaneously in an exemplary firing pattern. The subarrays may include any different combination and number of seismic sources within the array.

In an embodiment, an algorithm or computer program may be used to produce a set of optimal firing patterns to be used in to control the firing time interval. The firings of each seismic source are randomly sequenced in the firing time window. The resulting firing pattern is then examined for the maximum amplitude. If the maximum amplitude is significantly larger than that of the largest air gun, the scheduling of the times and order of the gun firings are re-randomized, and the maximum amplitude may be examined again. This process is repeated until a firing pattern is found with the desired amplitude. In the 2D example below, about 0.5 percent of the random patterns generated were suitable for use. The process may be repeated for as many patterns as are needed. In a further embodiment, the algorithm or computer program that may be used to produce a set of optimal firing patterns may also examine the firing pattern or generate optimal time intervals to enable optimal separation of the seismic signals while minimizing the output amplitude.

Figure 8:
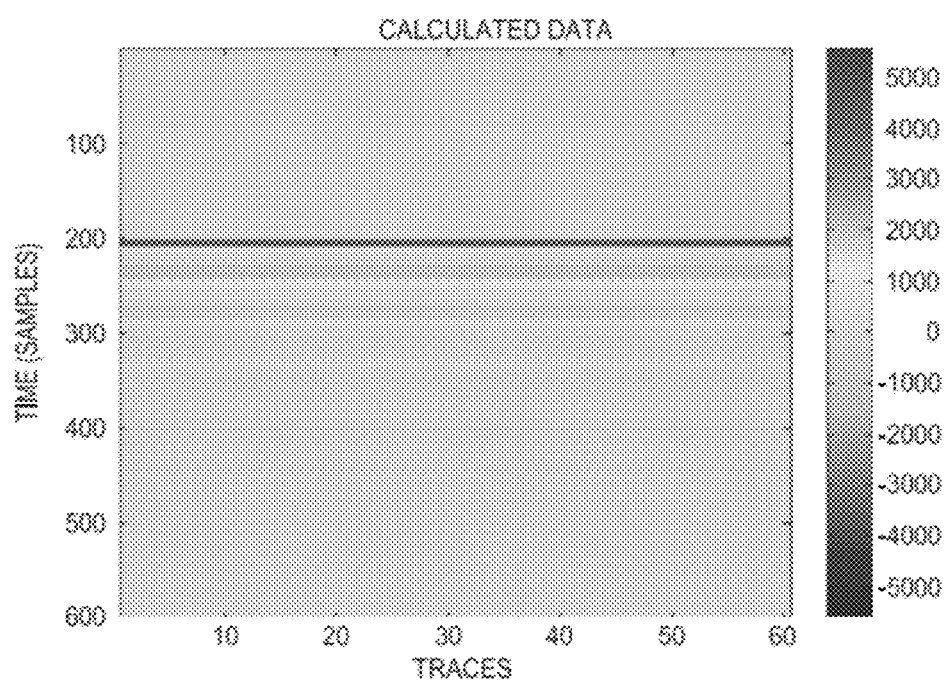
FIG. 8 illustrates the impulse response of the calculated air gun array after sparse inversion.
Figure 9:
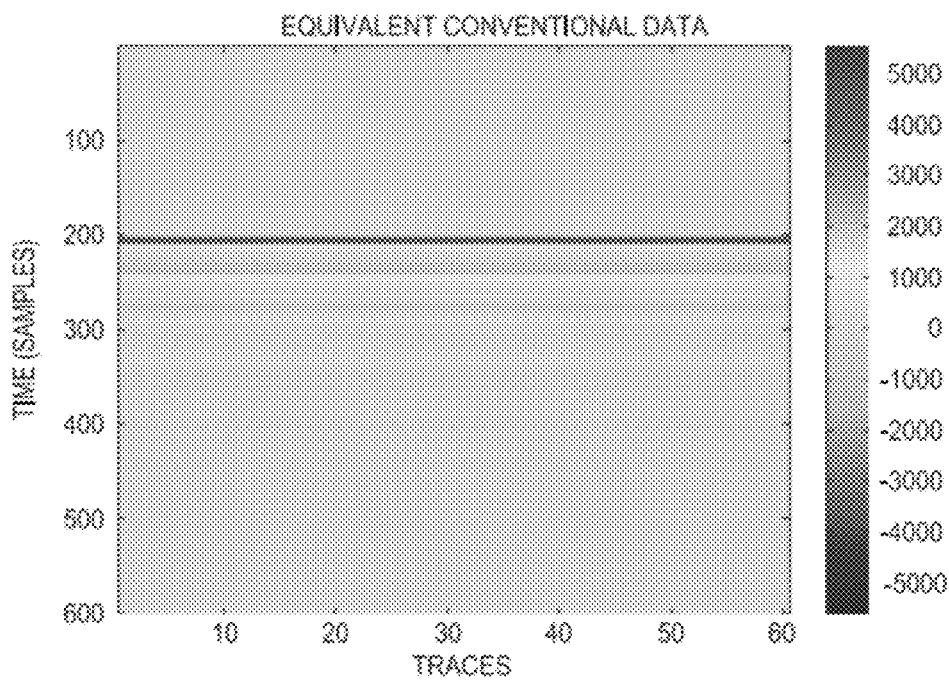
FIG. 9 illustrates the impulse response of a standard air gun array.

The number of patterns preferably must be large enough to prevent the undesired overlap of the notches in the spectra within the processing data spatial window. Testing the limits to overlap of the spectra may be done by processing simulated patterned shots to check the accuracy of the reconstruction. In particular, running the inversion using the calculated patterns on a spike likely will show any weaknesses in the patterns generated. The results of an example of such a test are shown in FIGS. 7 to 9.

The inversion method used to process seismic data acquired using the disclosed methods is similar to previously described methods for separating simultaneous shots. (See Abma, R. L., Manning, T, Tanis, M., Yu, J, and Foster, M., [2010] High Quality Separation of Simultaneous Sources by Sparse Inversion, 72nd Annual Conference and Exhibition, EAGE, Extended Abstracts and U.S. patent application Ser. No. 12/542,433, herein incorporated by reference for all purposes in their entireties) As such, the use of patterned air guns as a source may be replaced with that of other sources, for example, Vibroseis sources with different sweeps in a land setting, and the process will not change significantly. In other words, although the methods described herein are directed to marine seismic sources, the disclosed methods are also applicable in a land setting with land or onshore seismic sources.

Figure 7:
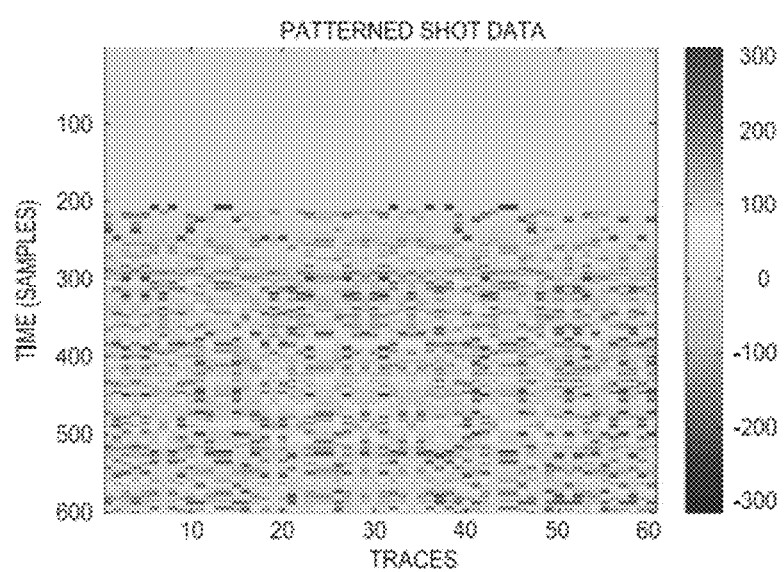
FIG. 7 illustrates the impulse response of the patterned air gun arrays.
Figure 10:
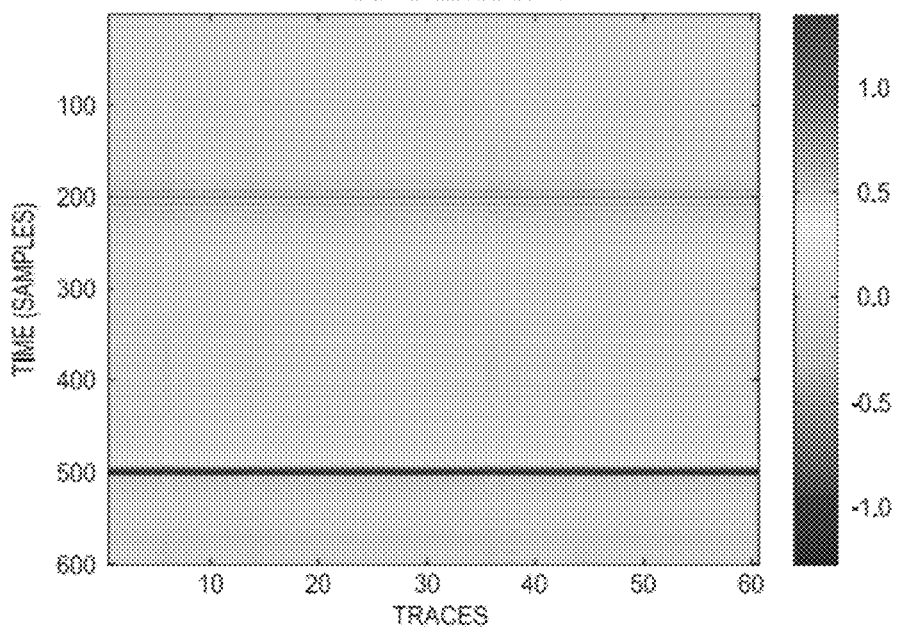
FIG. 10 illustrates the difference between the data in FIGS. 8 and 9 showing the reconstruction error.

FIG. 7 shows the impulse responses of a set of patterned shots along a shot line. The maximum amplitude produced by the patterned shots is much less than that of the conventional air gun array shown in FIG. 9. The result of the inversion process seen in FIG. 8 is almost exactly that of the conventional air gun array. The difference between the impulse responses in FIGS. 8 and 9 is shown in FIG. 10, which shows virtually no difference in response.

These patterns cannot be processed by conventional approaches to acquisition sources since the individual patterns cannot be decoded separately. Nevertheless, traditional codes may be used rather than the random patterns used here.

Figure 4:
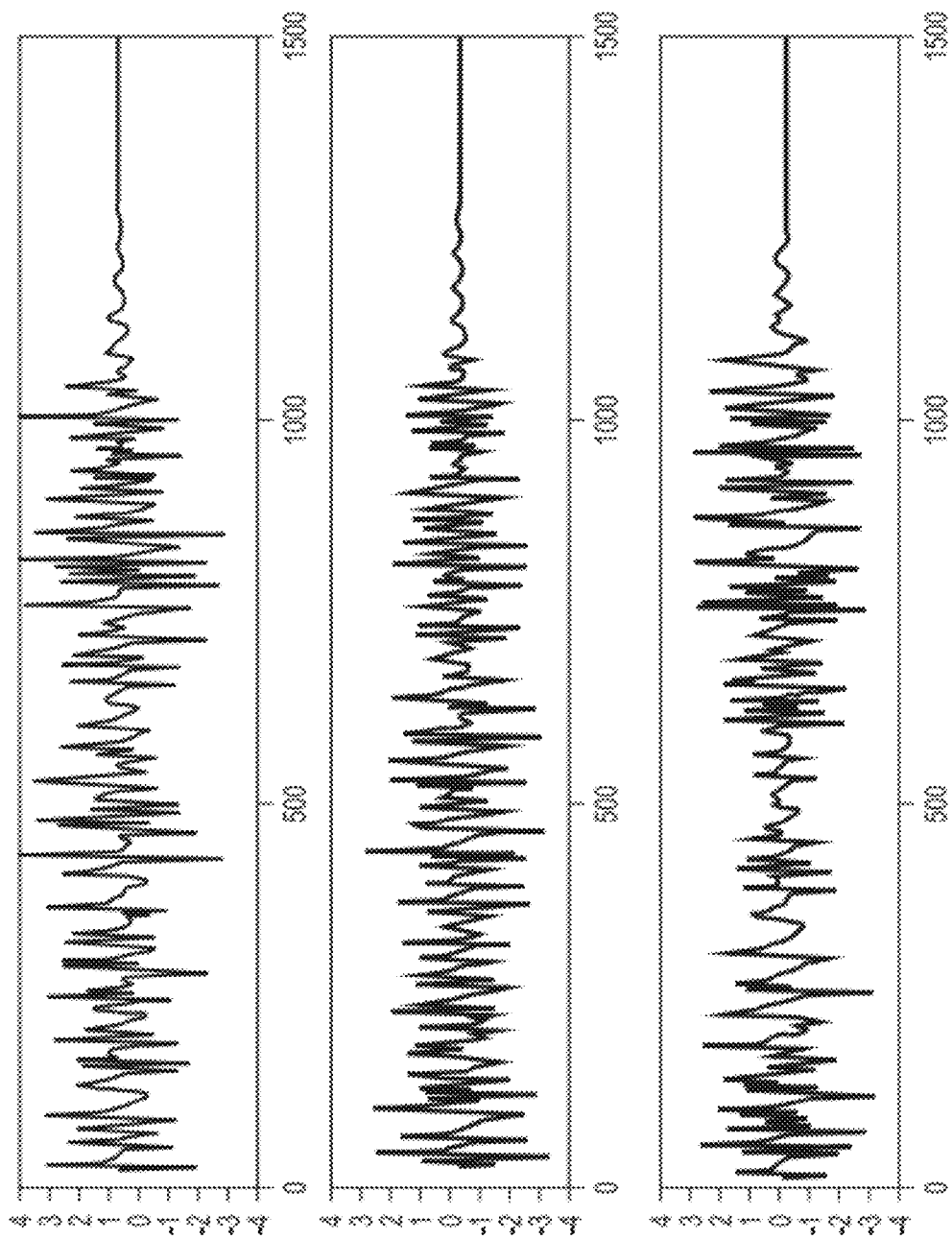
FIG. 4 illustrates the time signatures of three patterned shots, each consisting of 33 single gun shots. (The time scale is number of 2 msec samples.)

Normally converting the impulse of one source to another is done by a matching or deconvolution method. This involves inverting the system $$d \approx A m \qquad (1)$$

where d is the known or acquired data, m is the desired data, and A is the convolution operator. In creating firing patterns for air guns, the wavelets in FIG. 3 are spread out over time to create extended wavelets as seen in FIG. 4. Spreading these wavelets out in time creates notches in the spectra of the wavelets. The notches correspond to the null space of matrix A. Reconstructing the data in these notches on individual traces is difficult or impossible in real data, and attempts to do so results in noise generated by the inversion.

To eliminate the null space another constraint may be introduced, that of the spatial continuity of the data. Since the propagation of seismic waves through even the most irregular subsurface typically creates continuous wavefields, this continuity may be used to constrain the solutions. This changes Equation 1 to $$d \approx A\,C\,m \qquad (2)$$

where C is an operator that ensures that m is spatially continuous. Multidimensional Fourier transforms may be used with thresholding to calculate a continuity operator. Other coherency criteria may be used, such as the curvelet method suggested in Lin and Herrmann (2009). With enough iterations, thresholding the curvelets may produce similar results to those of the method described above, but thresholding in FK space is likely to be more effective and faster than the corresponding curvelet approach. Examples of alternative methods of incorporating the assumption of a coherent wavefield into the inversion would include various Radon transforms and prediction-error filters.

The inversion process used to solve for m may be similar to that of the POCS (Projection Onto Convex Sets) interpolation method used by Abma R., and Kabir, N. [2006] 3D interpolation of irregular data with a POCS algorithm, Geophysics, 71, E91-E97, herein incorporated by reference in its entirety for all purposes. Other inversion methods known to those of skill in the art, such as without limitation, the Spectral Projected Gradient L1 (SPGL1) Solver, may also be used to solve Equation 2. However, any suitable solver known to those of skill in the art may be used to solve Equation 2.

In general, a method of processing data acquired by the disclosed method may include using a Fourier transform method such as a Fast Fourier transform (FF) to remove a response from the pattern. The subsequent dataset may be arranged in order to enable the measurement of coherency. A two-dimensional (2D) or three-dimensional (3D) Fourier transform may be applied to the dataset. The resulting dataset may be thresholded and then inversed to create an inverse dataset. The response of the pattern may be applied to the inverse dataset to generate a new model. The new model is subtracted from the original seismic dataset to form a residual dataset. The residual dataset may then be used as the input for a next iteration.

Figure 23:
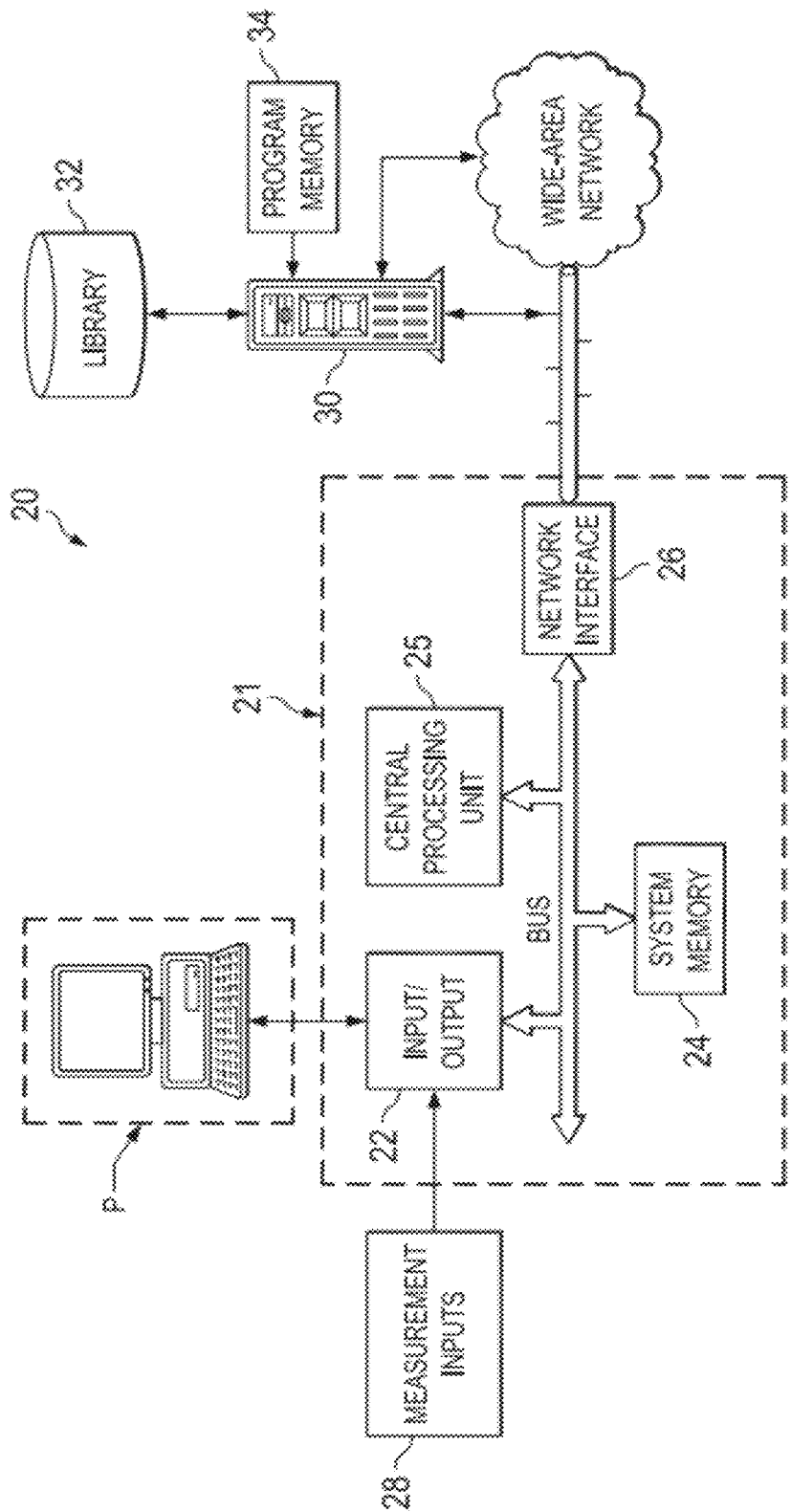
FIG. 23 illustrates an embodiment of a computer system for use with the disclosed methods.

FIG. 23 illustrates, according to an example of an embodiment computer system 20, which may perform the operations described in this specification to process the seismic data acquired by the disclosed methods or to generate the firing patterns. In this example, system 20 is as realized by way of a computer system including workstation 21 connected to server 30 by way of a network. Of course, the particular architecture and construction of a computer system useful in connection with this invention can vary widely. For example, system 20 may be realized by a single physical computer, such as a conventional workstation or personal computer, or alternatively by a computer system implemented in a distributed manner over multiple physical computers. Accordingly, the generalized architecture illustrated in FIG. 3 is provided merely by way of example.

As shown in FIG. 23 and as mentioned above, system 20 may include workstation 21 and server 30. Workstation 21 includes central processing unit 25, coupled to system bus. Also coupled to system bus BUS is input/output interface 22, which refers to those interface resources by way of which peripheral functions P (e.g., keyboard, mouse, display, etc.) interface with the other constituents of workstation 21. Central processing unit 25 refers to the data processing capability of workstation 21, and as such may be implemented by one or more CPU cores, co-processing circuitry, and the like. The particular construction and capability of central processing unit 25 is selected according to the application needs of workstation 21, such needs including, at a minimum, the carrying out of the functions described in this specification, and also including such other functions as may be executed by computer system. In the architecture of allocation system 20 according to this example, system memory 24 is coupled to system bus BUS, and provides memory resources of the desired type useful as data memory for storing input data and the results of processing executed by central processing unit 25, as well as program memory for storing the computer instructions to be executed by central processing unit 25 in carrying out those functions. Of course, this memory arrangement is only an example, it being understood that system memory 24 may implement such data memory and program memory in separate physical memory resources, or distributed in whole or in part outside of workstation 21. In addition, as shown in FIG. 2, measurement inputs 28 that are acquired from laboratory or field tests and measurements are input via input/output function 22, and stored in a memory resource accessible to workstation 21, either locally or via network interface 26.

Network interface 26 of workstation 21 is a conventional interface or adapter by way of which workstation 21 accesses network resources on a network. As shown in FIG. 2, the network resources to which workstation 21 has access via network interface 26 includes server 30, which resides on a local area network, or a wide-area network such as an intranet, a virtual private network, or over the Internet, and which is accessible to workstation 21 by way of one of those network arrangements and by corresponding wired or wireless (or both) communication facilities. In this embodiment of the invention, server 30 is a computer system, of a conventional architecture similar, in a general sense, to that of workstation 21, and as such includes one or more central processing units, system buses, and memory resources, network interface functions, and the like. According to this embodiment of the invention, server 30 is coupled to program memory 34, which is a computer-readable medium that stores executable computer program instructions, according to which the operations described in this specification are carried out by allocation system 30. In this embodiment of the invention, these computer program instructions are executed by server 30, for example in the form of a "web-based" application, upon input data communicated from workstation 21, to create output data and results that are communicated to workstation 21 for display or output by peripherals P in a form useful to the human user of workstation 21. In addition, library 32 is also available to server 30 (and perhaps workstation 21 over the local area or wide area network), and stores such archival or reference information as may be useful in allocation system 20. Library 32 may reside on another local area network, or alternatively be accessible via the Internet or some other wide area network. It is contemplated that library 32 may also be accessible to other associated computers in the overall network.

Of course, the particular memory resource or location at which the measurements, library 32, and program memory 34 physically reside can be implemented in various locations accessible to allocation system 20. For example, these data and program instructions may be stored in local memory resources within workstation 21, within server 30, or in network-accessible memory resources to these functions. In addition, each of these data and program memory resources can itself be distributed among multiple locations. It is contemplated that those skilled in the art will be readily able to implement the storage and retrieval of the applicable measurements, models, and other information useful in connection with this embodiment of the invention, in a suitable manner for each particular application.

According to this embodiment, by way of example, system memory 24 and program memory 34 store computer instructions executable by central processing unit 25 and server 30, respectively, to carry out the functions described in this specification, by way of which the firing patterns may be generated and also seismic data may be processed. These computer instructions may be in the form of one or more executable programs, or in the form of source code or higher-level code from which one or more executable programs are derived, assembled, interpreted or compiled. Any one of a number of computer languages or protocols may be used, depending on the manner in which the desired operations are to be carried out. For example, these computer instructions may be written in a conventional high level language, either as a conventional linear computer program or arranged for execution in an object-oriented manner These instructions may also be embedded within a higher-level application. For example, an executable web-based application can reside at program memory 34, accessible to server 30 and client computer systems such as workstation 21, receive inputs from the client system in the form of a spreadsheet, execute algorithms modules at a web server, and provide output to the client system in some convenient display or printed form. It is contemplated that those skilled in the art having reference to this description will be readily able to realize, without undue experimentation, this embodiment of the invention in a suitable manner for the desired installations. Alternatively, these computer-executable software instructions may be resident elsewhere on the local area network or wide area network, or downloadable from higher-level servers or locations, by way of encoded information on an electromagnetic carrier signal via some network interface or input/output device. The computer-executable software instructions may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by allocation system 20 in the conventional manner for software installation.

EXAMPLE

Figure 11:
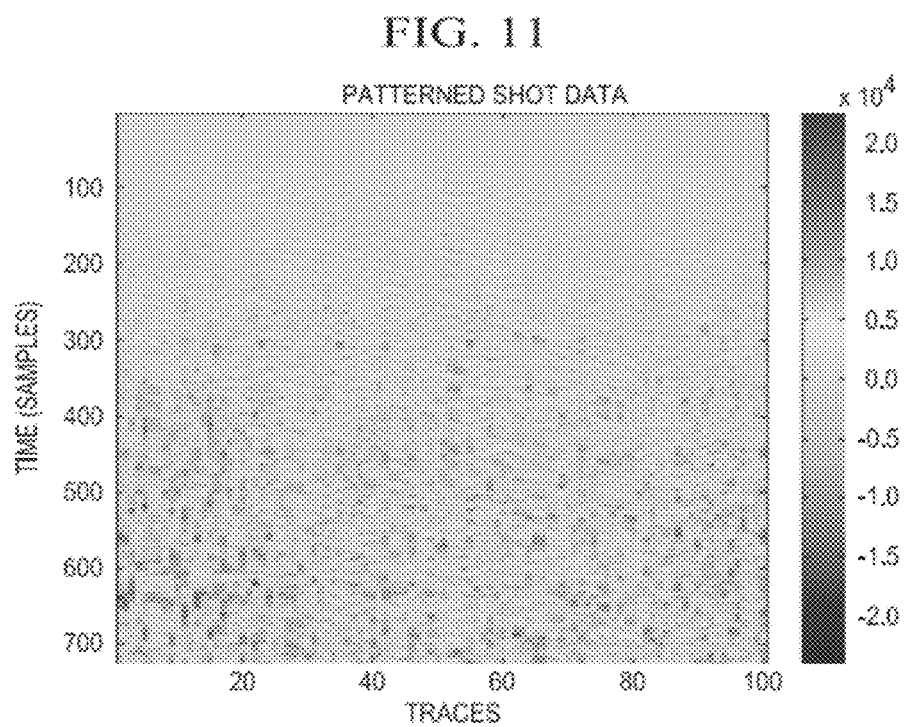
FIG. 11 illustrates patterned shooting acquisition on a 3D synthetic.
Figure 12:
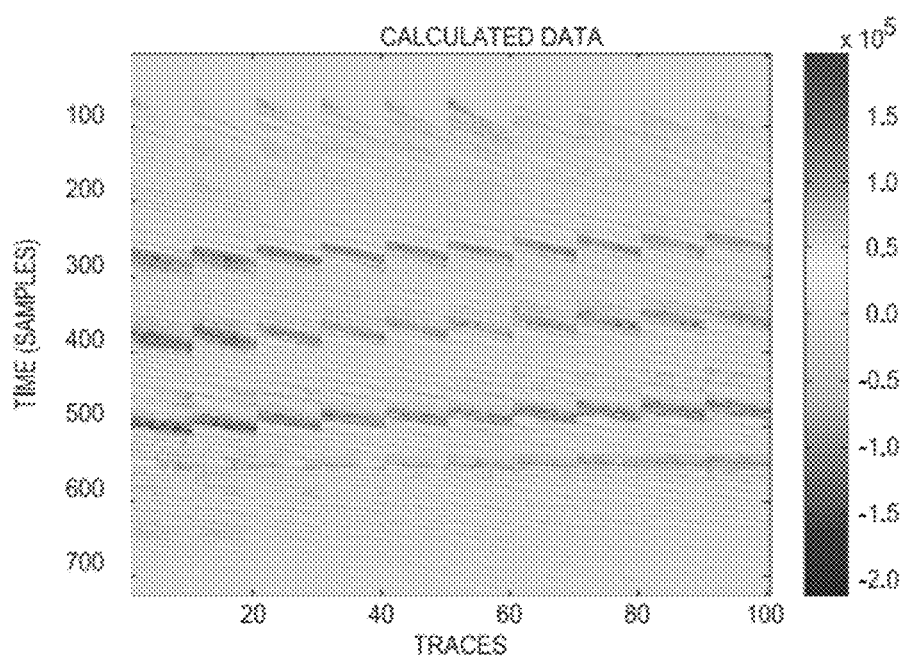
FIG. 12 illustrates the calculated data derived from the patterned source 3D data in FIG. 8.
Figure 13:
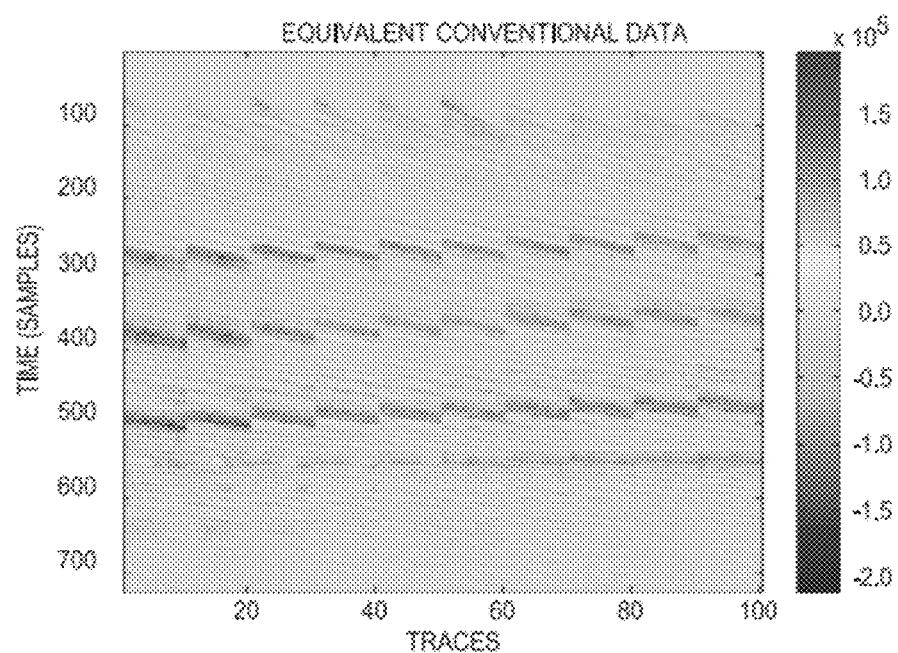
FIG. 13 illustrates conventionally acquired 3D data.
Figure 14:
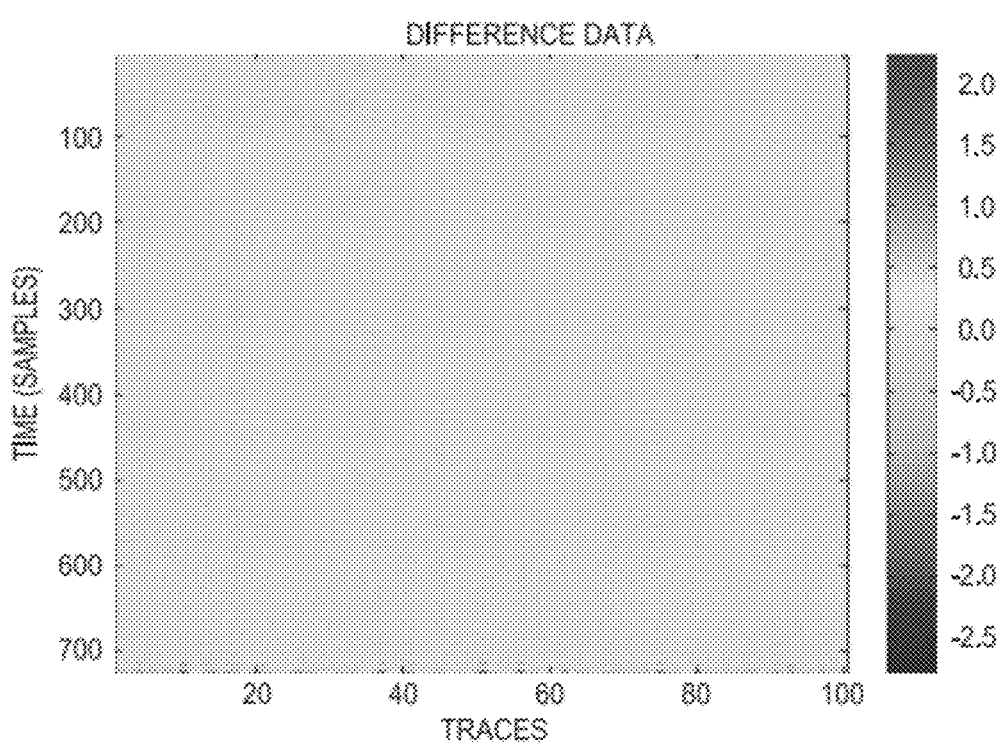
FIG. 14 illustrates the difference between FIGS. 9 and 10 showing the reconstruction error.

A synthetic or modeled example of a 3D dataset with patterned shot acquisition is shown in FIG. 11. FIG. 12 shows the data calculated to match conventional shooting, and FIG. 13 shows the conventional result. FIG. 14 shows the difference between the data shown in FIGS. 12 and 13.

Figure 15:
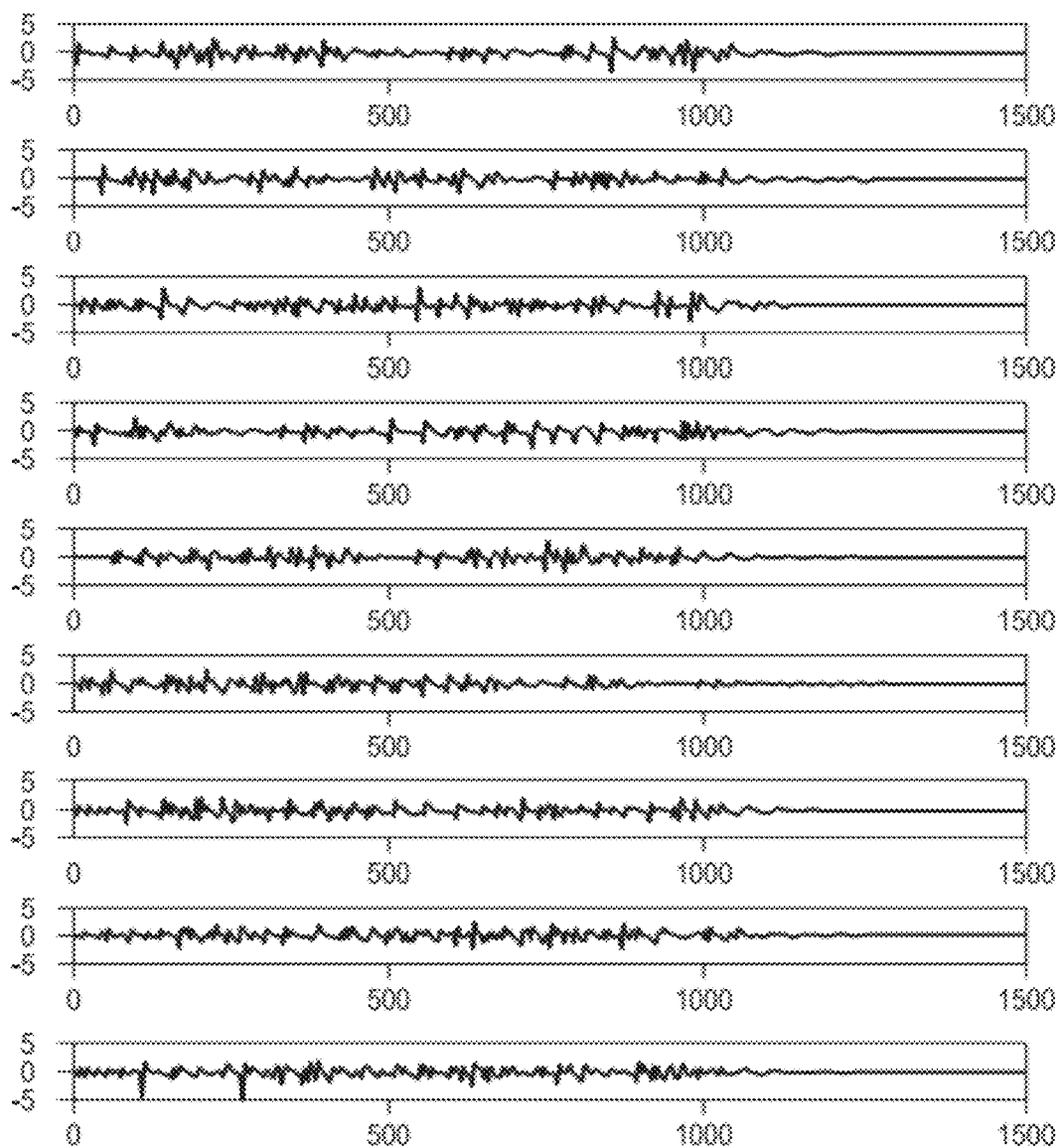
FIG. 15 illustrates the impulse response of the 9 patterned shots used to generate FIG. 8. (Horizontal axis is number of 2 msec samples.)
Figure 16:
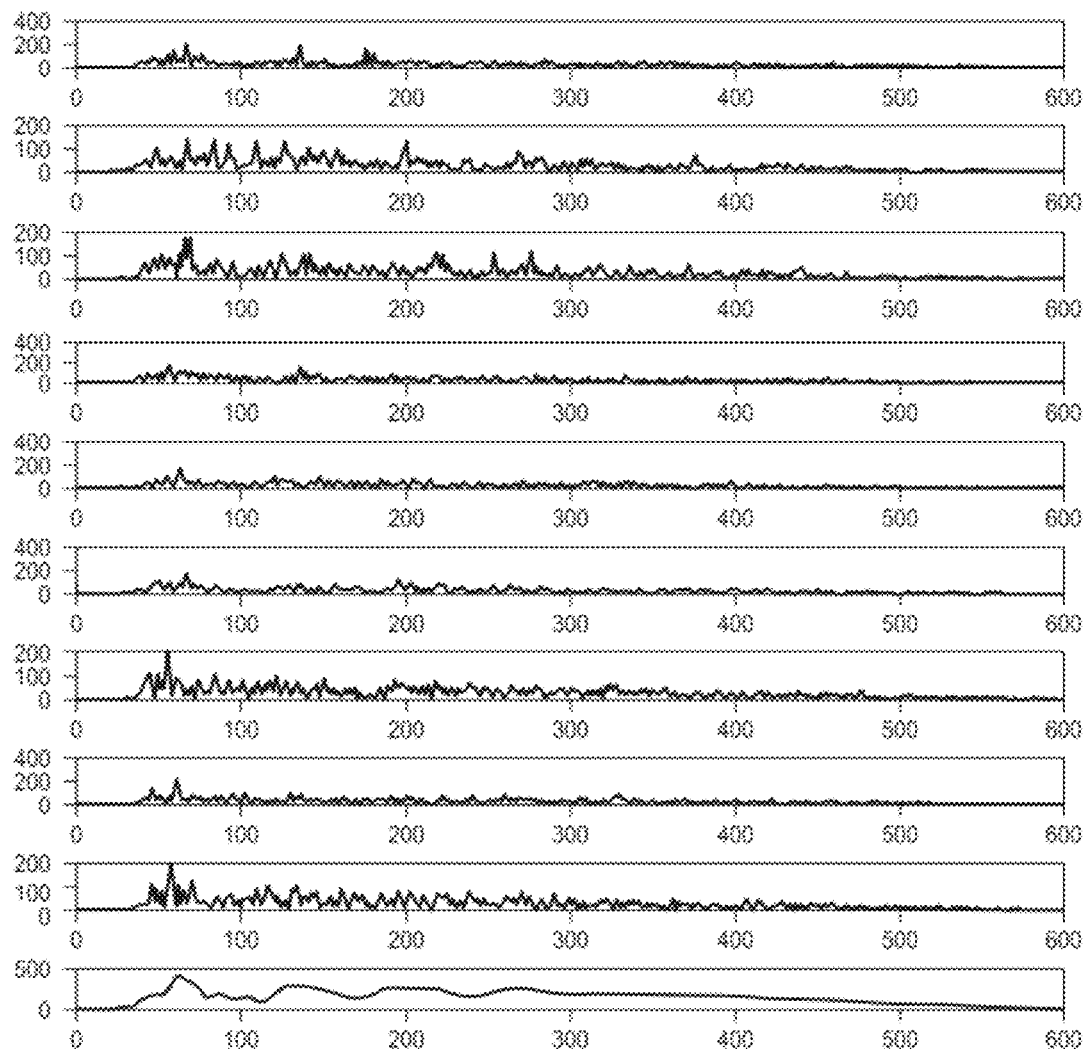
FIG. 16 illustrates the spectra of the nine patterned shots shown in FIG. 12 with the spectra of the desired signature seen in FIG. 2 shown as the bottom spectrum.
Figure 17:
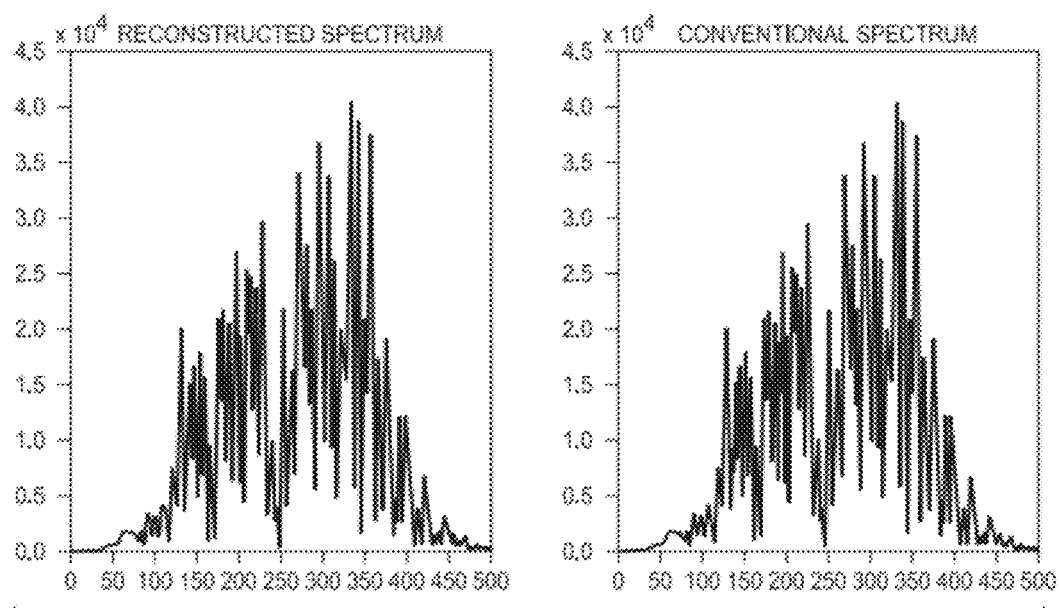
FIG. 17 illustrates the spectra of the data resulting from the inversion of the patterned data and conventionally acquired 3D data.
Figure 18:
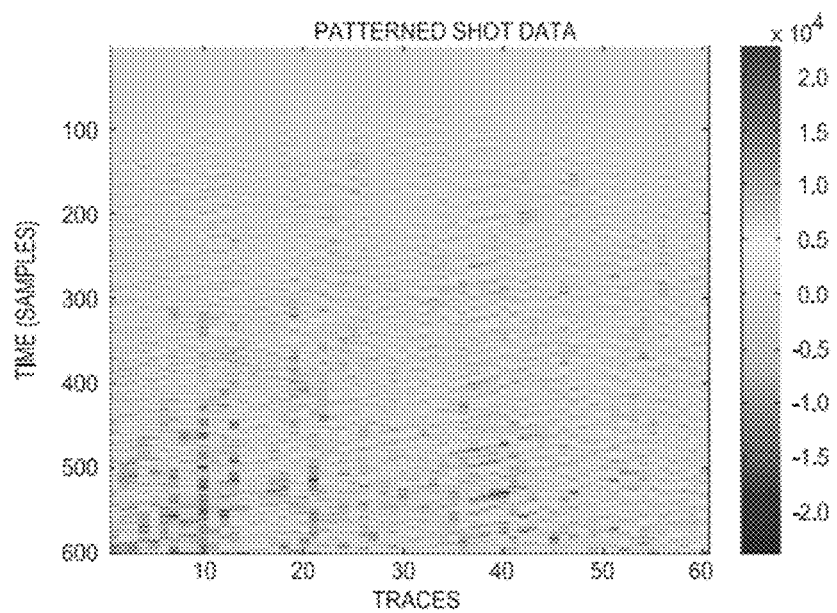
FIG. 18 illustrates patterned shot data for a 2D dataset.
Figure 19:
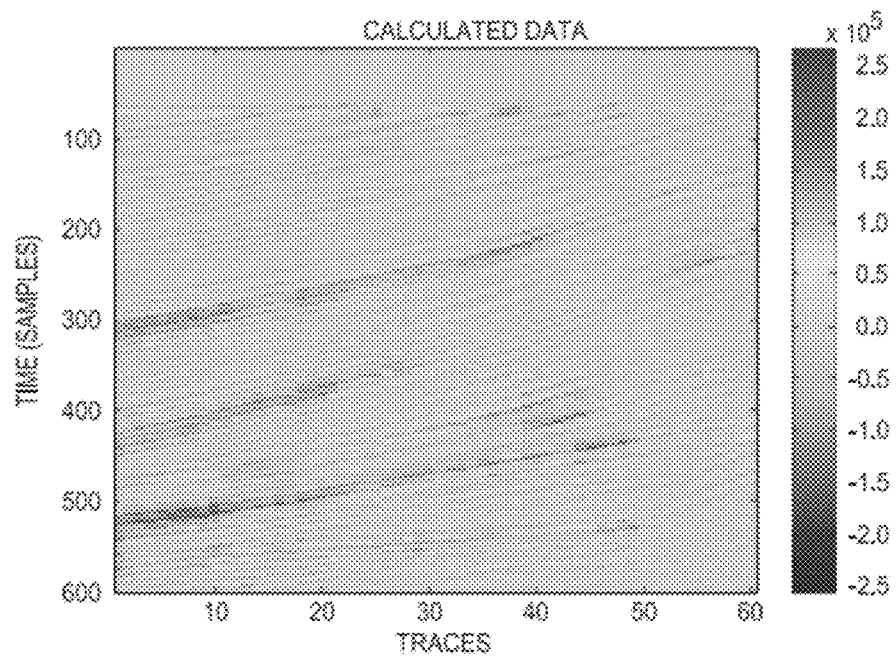
FIG. 19 illustrates the calculated data from the 2D patterned shot data seen in FIG. 15.
Figure 20:
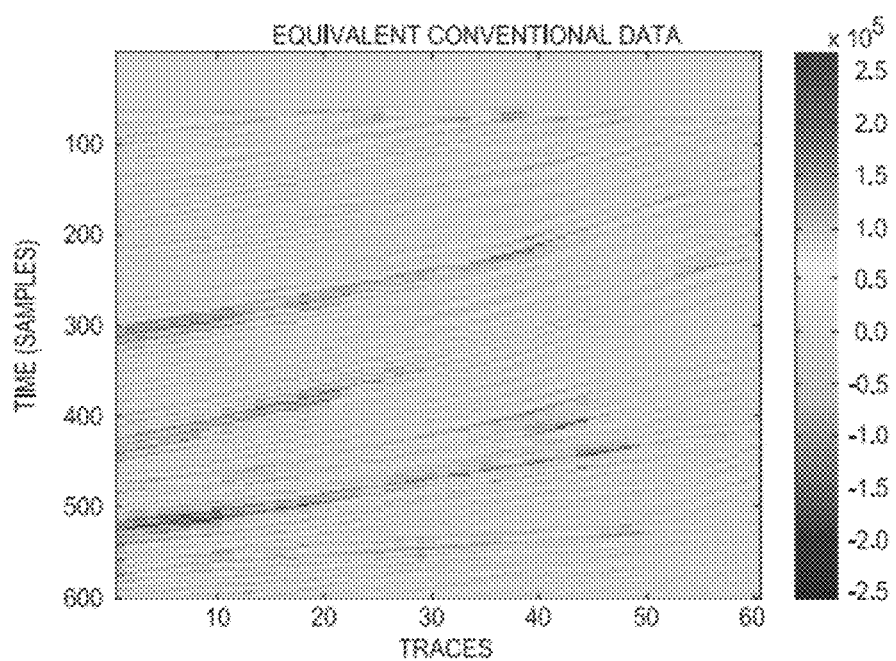
FIG. 20 illustrates conventionally acquired data from the 2D dataset.
Figure 21:
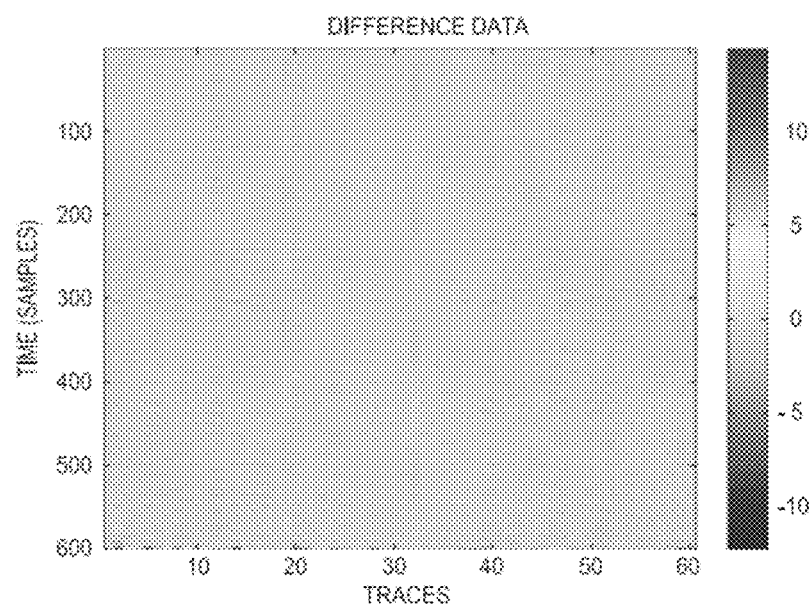
FIG. 21 illustrates the difference between the calculated and conventionally acquired 2D datasets.
Figure 22:
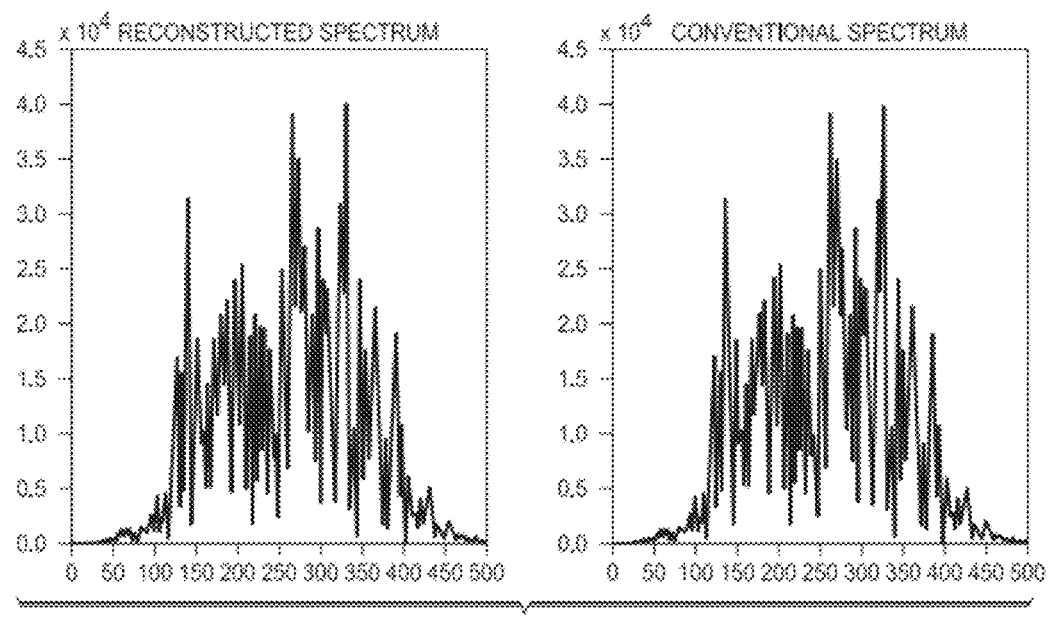
FIG. 22 illustrates the spectra of the data resulting from the inversion of the patterned data and conventionally acquired 2D data.

Note that the amplitudes of the data in FIG. 8 are considerably lower than those in FIGS. 12 and 13, and that the data in FIG. 11 is much less coherent than that in FIGS. 12 and 13. This is due to the extended signatures of the randomly assigned source patterns used here. Each shot was assigned a random pattern from FIG. 15. FIG. 16 shows the spectra of the nine patterns as well as the spectra of the desired impulse seen in FIG. 5. While each of the nine patterns show significant notches and irregularity in their spectra, the spectra of the calculated data matches that of the conventionally acquired data seen in FIG. 17, indicating the inversion was a success.

While the embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A method of seismic acquisition comprising:
   (a) positioning a first seismic source array comprising a plurality of seismic sources over a seismic survey region, the seismic source array capable of generating an array output amplitude when all of said plurality of seismic sources are activated simultaneously;
   (b) choosing a plurality of different firing patterns, each of said plurality of firing patterns having a pattern output amplitude associated therewith, wherein said pattern output amplitude is a maximum amplitude of said seismic source array when said seismic source array is activated according to said associated firing pattern, and, wherein
      (i) each of said plurality of different firing patterns is less than 10 seconds in length and greater than 0.5 seconds in length;
      (ii) each of said plurality of different firing patterns is chosen such that said associated pattern output amplitude is less than said array output amplitude; and,
      (iii) each of said firing patterns creates a plurality of notches in a frequency spectrum of any seismic data recorded therefrom;
   (c) activating the first seismic source array according to a selected one of a the plurality of different firing patterns;
   (d) performing step (c) at least two times for at least two different selected ones of the plurality of firing patterns;
   (e) recording a plurality of seismic signals reflected from one or more subterranean formations; and,
   (f) processing said plurality of seismic signals using a sparse inversion to produce processed seismic signals for use in seismic exploration, wherein said sparse inversion is obtained by solving $$d \approx A\,C\,m$$

for m, where d is an acquired dataset from recording the plurality of seismic signals in (e), m is the processed seismic signals, C is an operator that ensures that m is spatially continuous, and A is a convolution operator chosen such that said notches correspond to a null space of A.

2. The method of claim 1 wherein at least two of the seismic sources within the first seismic source array generate energy with different frequency ranges.

3. The method of claim 1 wherein each firing pattern further comprises an order for activating each seismic source, wherein the order for each firing pattern is different from one another.

4. The method of claim 1 wherein at least one of the plurality of different firing patterns comprises a plurality of different time intervals between an activation of each seismic source within the first seismic source array, and wherein the plurality of different time intervals in the at least one of the plurality of different firing patterns are varied pseudo-randomly.

5. The method of claim 1 wherein the seismic sources are impulsive sources.

6. The method of claim 1 wherein the seismic sources are marine sources.

7. The method of claim 1 wherein the seismic sources are land sources.

8. The method of claim 1, wherein (a) comprises towing the seismic source array underwater behind a seismic vessel.

9. The method of claim 1 wherein the seismic sources comprise air guns, explosives, gas guns, or combinations thereof.

10. The method of claim 9 wherein the air guns comprise different volumes.

11. The method of claim 1 wherein at least one of the plurality of different firing patterns reduces its associated pattern output amplitude by at least 20 dB when compared to the array output amplitude.

* * * * *